United States Patent
Caldwell et al.

(10) Patent No.: US 9,116,984 B2
(45) Date of Patent: Aug. 25, 2015

(54) SUMMARIZATION OF CONVERSATION THREADS

(75) Inventors: Nicholas Caldwell, Bellevue, WA (US); Saliha Azzam, Redmond, WA (US); Diego Perez Del Carpio, Redmond, WA (US); Ye-Yi Wang, Redmond, WA (US); Yizheng Cai, Sammamish, WA (US); Michael Gamon, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 13/170,787

(22) Filed: Jun. 28, 2011

(65) Prior Publication Data

US 2013/0006973 A1 Jan. 3, 2013

(51) Int. Cl.
*G06F 17/30* (2006.01)

(52) U.S. Cl.
CPC .................. *G06F 17/30719* (2013.01)

(58) Field of Classification Search
CPC .................................. G06F 17/30719
See application file for complete search history.

(56) References Cited

U.S. PATENT DOCUMENTS

| | | | |
|---|---|---|---|
| 6,346,952 B1 * | 2/2002 | Shtivelman | 715/758 |
| 7,392,280 B2 * | 6/2008 | Rohall et al. | 709/201 |
| 7,421,690 B2 * | 9/2008 | Forstall et al. | 718/100 |
| 7,739,261 B2 | 6/2010 | Zeng et al. | |
| 7,899,871 B1 | 3/2011 | Kumar et al. | |
| 8,595,303 B2 * | 11/2013 | Plotts et al. | 709/206 |
| 8,626,832 B2 * | 1/2014 | Jerrard-Dunne et al. | 709/204 |
| 2003/0163537 A1 | 8/2003 | Rohall et al. | 709/206 |
| 2005/0165739 A1 | 7/2005 | Yamamoto et al. | |
| 2005/0235034 A1 | 10/2005 | Chen et al. | |
| 2005/0262199 A1 | 11/2005 | Chen et al. | |
| 2006/0010217 A1 * | 1/2006 | Sood | 709/206 |
| 2006/0195785 A1 | 8/2006 | Portnoy et al. | 715/700 |
| 2006/0259473 A1 | 11/2006 | Li et al. | |
| 2007/0168445 A1 | 7/2007 | Genty et al. | |
| 2007/0250576 A1 | 10/2007 | Kumar et al. | |
| 2008/0021969 A1 * | 1/2008 | Oliver et al. | 709/206 |
| 2008/0082607 A1 * | 4/2008 | Sastry et al. | 709/204 |
| 2008/0201434 A1 | 8/2008 | Holmes et al. | |
| 2008/0208975 A1 | 8/2008 | Olive | |
| 2008/0235018 A1 | 9/2008 | Eggen et al. | |
| 2008/0282159 A1 * | 11/2008 | Vanderwende et al. | 715/700 |

(Continued)

OTHER PUBLICATIONS

Faulring, Andrew, et al. "Agent-Assisted Task Management that Reduces Email Overload". School of Computer Science, Carnegie Mellon University. Published Feb. 7-10, 2010. 10 pgs.

(Continued)

*Primary Examiner* — Richard Bowen
(74) *Attorney, Agent, or Firm* — Jessica Meyers; Danielle Johnston-Holmes; Micky Minhas (57) ABSTRACT

Automatically summarizing electronic communication conversation threads is provided. Electronic mails, text messages, tasks, questions and answers, meeting requests, calendar items, and the like are processed via a combination of natural language processing and heuristics. For a given conversation thread, for example, an electronic mail thread associated with a given task, a text summary of the thread is generated to highlight the most important text in the thread. The text summary is presented to a user in a visual user interface to allow the user to quickly understand the significance or relevance of the thread.

20 Claims, 6 Drawing Sheets

(56) References Cited

U.S. PATENT DOCUMENTS

| | | | |
|---|---|---|---|
| 2008/0301250 A1 | 12/2008 | Hardy et al. | |
| 2009/0006369 A1* | 1/2009 | Guday et al. | 707/5 |
| 2009/0031244 A1* | 1/2009 | Brezina et al. | 715/781 |
| 2009/0055481 A1 | 2/2009 | Carmel et al. | |
| 2009/0106676 A1* | 4/2009 | Brezina et al. | 715/763 |
| 2009/0319629 A1* | 12/2009 | de Guerre et al. | 709/206 |
| 2010/0030781 A1* | 2/2010 | Wong et al. | 707/9 |
| 2010/0030798 A1 | 2/2010 | Kumar et al. | |
| 2010/0042570 A1* | 2/2010 | Mayers et al. | 706/46 |
| 2010/0100370 A1 | 4/2010 | Khouri et al. | |
| 2010/0268601 A1 | 10/2010 | Bosarge et al. | |
| 2010/0332608 A1 | 12/2010 | Wei et al. | |
| 2011/0067037 A1 | 3/2011 | Kawai et al. | |
| 2011/0078167 A1 | 3/2011 | Sundaresan et al. | |
| 2011/0119593 A1 | 5/2011 | Jacobson et al. | |
| 2011/0185024 A1* | 7/2011 | Ramarao et al. | 709/206 |
| 2011/0246482 A1 | 10/2011 | Badenes et al. | |
| 2012/0005221 A1 | 1/2012 | Ickman et al. | |
| 2012/0102037 A1 | 4/2012 | Ozonat | |
| 2012/0158989 A1 | 6/2012 | Patil et al. | |
| 2012/0179449 A1* | 7/2012 | Raskino et al. | 704/2 |
| 2013/0007137 A1 | 1/2013 | Azzam et al. | |

OTHER PUBLICATIONS

Zhou, Xiadong. "Discovering and Summarizing Email Conversations". A thesis submitted in partial fulfillment of the requirements for the degree of Doctor of Philosophy in The Faculty of Graduate Studies (Computer Science). The University of British Columbia. http://citeseerx.ist.psu.edu/viewdoc/download?doi=10.1.1.112.99&rep=rep1&type=pdf. Feb. 2008. 280 pgs.

Ulrich, Jan. "Supervised machine Learning for Email Thread Summarization". A thesis submitted in partial fulfillment of the requirements for the degree of Master of Science in The Faculty of Graduate Studies (Computer Science). The University of British Columbia. http://circle.ubc.ca/bitstream/handle/2429/2363/ubc_2008 _fall _ulrich_jan.pdf?sequence=1. Published Sep. 2008. 79 pgs.

Oliver, Simon Corston-, et al. "Integration of Email and Task Lists". http://ceas.cc/2004/134.pdf. Retrieved Sep. 7, 2010. 2 pgs.

Ulrich, Jan, et al. "A Publicly Available Annotated Corpus for Supervised Email Summarization". Department of Computer Science. University of British Columbia, Canada. http://www.cs.ubc.ca/~carenini/PAPERS/ulrich-sssi08.pdf. Retrieved Sep. 7, 2010. 6 pgs.

Liu, Hugo, et al. "Robust Identification and Extraction of Meeting Requests from Email Using a Collocational Semantic Grammar". http://web.media.mit.edu/~hugo/publications/drafts/MeetingRunner-CIKM-liu.2.doc. Retrieved Sep. 7, 2010. 8 pgs.

Kwong, Helen, et al. "Detection of Imperative and Declarative Question-Answer Pairs in email Conversations". http://ijcai.org/papers09/Papers/IJCAI09-254.pdf. Retrieved Sep. 7, 2010. 6 pgs.

Dalli, Angelo, et al. "FASIL Email Summarisation System". NLP Research Group. Department of Computer Science. University of Sheffield. http://aclweb.org/anthology-new/C/C04/C04-1143.pdf. 7 pgs.

Oliver, Simon Corston-, et al. "Task-focused Summarization of Email". Microsoft Research. One Microsoft Way. Redmond, WA 98052. http://acl.ldc.upenn.edu/W/W04/W04-1008.pdf. 8 pgs.

Bengel, J., Gauch, S., Mittur, E., and Vijayaraghavan, R. *ChatTrack: Chat Room Topic Detection Using Classification*. Published: Oct. 20, 2005. 10 pp.

Dong, H., Hui, S., and He, Y. *Structural Analysis of Chat Messages for Topic Detection*. Published Date: May 2, 2006. http://www.cnts.ua.ac.be/~walter/educational/material/chatMsgAnalysis06.pdf. 33 pp.

Trausan-Matu, S., Rebedea, T., Dragan, A., and Alexandru, C. *Visualisation of Learners' Contributions in Chat Conversations*. Published Date: 2007. http://citeseerx.ist.psu.edu/viewdoc/download?doi=10.1.1.954885&rep=rep1&type=pdf. 10 pp.

U.S. Non-Final Office Action for U.S. Appl. No. 13/171,238 mailed Nov. 26, 2012.

International Search Report and Written Opinion for PCT/US2012/043848 mailed Jan. 25, 2013.

Murry et al., "Summarizing Spoken and Written Conversation." Proceedings of the Conference on Empirical Methods in Natural Language Processing, Oct. 2008, pp. 773-782.

Radev et al., "News in Essence: Summarizing Online News Topics." Communications of the ACM, Oct. 2005, vol. 48, No. 10, pp. 95-98.

Waibel et al. "Meeting Browser: Tracking and Summarizing Meetings." Proceedings of the DARPA Broadcast News Transcription and Understanding Workshop, Feb. 1998, pp. 281-286.

U.S. Final Office Action for U.S. Appl. No. 13/171,238 mailed Jun. 4, 2013.

U.S. Non-Final Office Action for U.S. Appl. No. 13/171,238 mailed Aug. 14, 2014.

"Supplementary Search Report Issued for European Patent Application No. 12805128.1", Mailed Date: Feb. 20, 2015, 6 Pages.

Nenkova et al., "Facilitating Email Thread Access by Extractive Summary Generation," Recent Advances in Natural Language Processing, Papers from the RANLP Conference, pp. 287-296 (Sep. 10, 2003).

Rambow et al., "Summarizing Email Threads," Proceedings of the Conference of the North American Chapter of the Association for Computational Linguistics (NAACL) Short Paper Section, 4 pages (Apr. 2004).

U.S. Final Office Action for U.S. Appl. No. 13/171,238 mailed Dec. 26, 2014.

Zajic et al., "Single-document and multi-document summarization techniques for email threads using sentence compression," Information Processing and Management, vol. 44, pp. 1600-1610 (Jul. 2008).

* cited by examiner

SUMMARIZATION OF CONVERSATION THREADS

BACKGROUND

Within any number of business, social, or academic enterprises, electronic mail typically serves as the primary source of communication among members of the enterprise as well as among members of the enterprise and persons outside the enterprise. Unfortunately, when electronic mail users receive tens or even hundreds of emails, they may become overwhelmed and have trouble prioritizing which electronic mail messages to read first or to otherwise process. Typically, users want to quickly find electronic mail conversations associated with tasks, questions, meeting proposals, and the like. Once a given electronic mail conversation or messaging thread is identified as having the desired information, the users want to jump directly to the most important parts of the given electronic mail or messaging item. The quicker users can find and read through appropriate electronic mail or messaging items, the easier it is for them to deal with electronic mail and messaging overload.

It is with respect to these and other considerations that the present invention has been made.

SUMMARY

Embodiments of the present invention solve the above and other problems by automatically summarizing electronic communication conversation threads. According to embodiments, electronic mails, text messages, instant messages, tasks, questions and answers, meeting requests, calendar items, and the like are processed via a combination of natural language processing and heuristics. For a given conversation thread, for example, an electronic mail thread associated with a given task, a text summary of the thread is generated to highlight the most important text in the thread. The text summary is presented to a user in a visual user interface to allow the user to quickly understand the significance or relevance of the thread.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

As previously described above, embodiments of the present invention are directed to automatically summarizing electronic conversation threads and to providing a summary of one or more electronic conversation thread items in a user interface component for review by one or more users associated with the conversation thread items. The following description refers to the accompanying drawings. Whenever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Referring now to the drawings, in which like numerals represent like elements through the several figures, aspects of the present invention and the exemplary operating environment will be described. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1A:
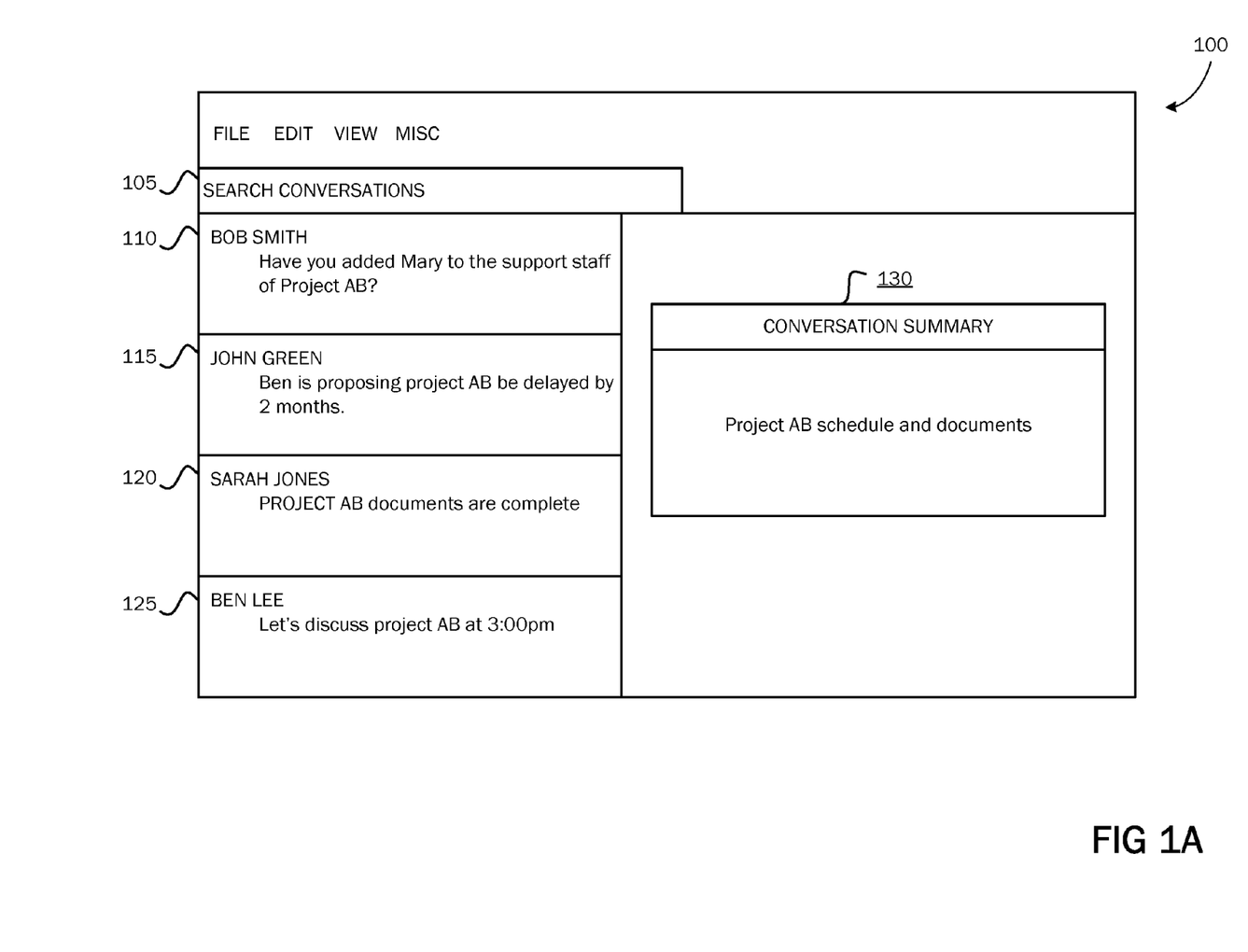
FIG. 1A illustrates a screen shot of an electronic user interface showing a conversation thread and showing a conversation summary automatically generated for the conversation thread.

FIG. 1A illustrates a screen shot of an electronic user interface showing a conversation thread and showing a conversation summary automatically generated for the conversation thread. In FIG. 1A, an electronic mail conversation thread is displayed showing four sequential electronic mail messages comprising a conversation thread associated with some topic or issue. The example electronic mail items, illustrated in FIG. 1A, are for purposes of illustration only and are not limiting of other types of electronic communication items that may be grouped together as a conversation thread. For example, the electronic communication items, illustrated in FIG. 1A, may be illustrative of a conversation thread comprised of various text messages displayed on a handheld computing device, the communication items may be illustrative of a conversation thread comprised of communication items from a discussion board, for example, an Internet-based chat forum, and the like. That is, embodiments of the present invention may be utilized for providing a conversation summary for any type of electronic communication item, as described below.

Referring still to FIG. 1A, in a typical situation, a given user may receive tens or hundreds of electronic mail messages, text messages, discussion forum messages, and the like over any given period of time, and each of the received messages may relate to a variety of different issues. For example, electronic communications may include tasks that need to be performed by a user, meetings that need to be attended by a user, questions to a user, answers to a user, general information about some upcoming event, and the like. If a user is interested in all messages associated with a given topic or issue, the user may perform a search function to retrieve all messages or mail items related to the given topic, for example, a particular project with which the user is associated. Unfortunately, after the user performs a search function, the user may still receive a large list of electronic mail items or other similar messages related to the searched topic.

According to embodiments of the invention, a conversation summary may be generated for a group of messages, for example, electronic mail items, associated with a given topic, and the conversation summary may be displayed in a user interface component to allow the user to quickly understand the nature and relevance of the conversation thread. As illustrated in FIG. 1A, an example conversation thread is displayed comprised of four electronic mail items. As should be appreciated, in a typical electronic mail environment, a user may have received tens or even hundreds of electronic mail items grouped together in a conversation thread as a result of a search on a given topic, for example, a search on a given project.

Referring still to FIG. 1A, each of the example electronic mail items displayed in the example electronic mail user interface is associated with a common project, "project AB." According to embodiments of the present invention, and as will be described below, information about each of the communication items contained in the communication thread is extracted, and a conversation summary is generated. As illustrated in FIG. 1A, a conversation summary user interface 130 may then be displayed to the user containing a brief summary of the conversation thread. For example, referring to the user interface 130, a brief conversation summary of "Project AB schedule and documents" is illustrated in the user interface component 130. Thus, after the user searches on messages, for example, electronic mail items, associated with a given topic, the conversation summary illustrated in the user interface component 130 may be automatically displayed to give the user a quick understanding of the nature and relevance of the communication thread. For example, the user may have sorted his/her electronic mail items based on a particular sender of the electronic mail items, or based on a particular time period in which electronic mail items are received, and the user may not realize the particular relevance of the resulting thread. However, the conversation summary displayed to the user in the user interface component 130 may be used to provide a conversation summary for the user to allow the user to know the relevance of the conversation thread items at a glance by quickly reviewing the conversation summary displayed to the user in the conversation summary user interface component 130.

Figure 1B:
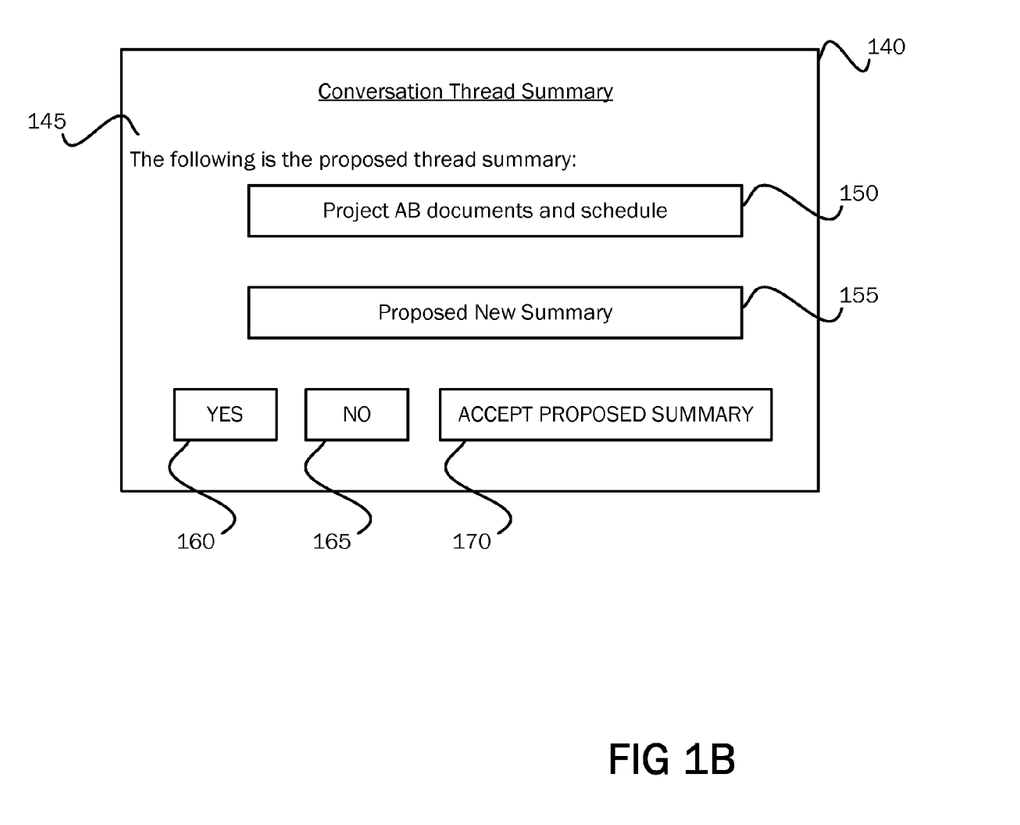
FIG. 1B illustrates a screen shot of an electronic user interface for allowing a user to approved, reject or modify a candidate conversation thread summary.

According to one embodiment, before a conversation thread summary is finalized, a candidate thread summary may be presented to a user for acceptance, rejection or modification. Referring to FIG. 1B, the user interface component 140 includes an example header of "Conversation Thread Summary" to indicate to the user that a candidate conversation thread summary is presented for review. A heading 145 such as "The following is a proposed conversation thread summary" may be provided above a text box or field 150 in which an indication candidate thread summary is displayed. For example, in the text box or field 150, illustrated in FIG. 1B, a candidate summary of "Project AB documents and schedule" is displayed. If the user accepts the candidate summary, it will be used as the summary for the associated communication thread. If the user rejects the candidate summary, an alternate summary may be provided. And, if the user desires a different summary, the user may enter a replacement summary in the text box/field 155, and the user-entered replacement summary will be used as the summary for the associated communication thread.

Figure 2:
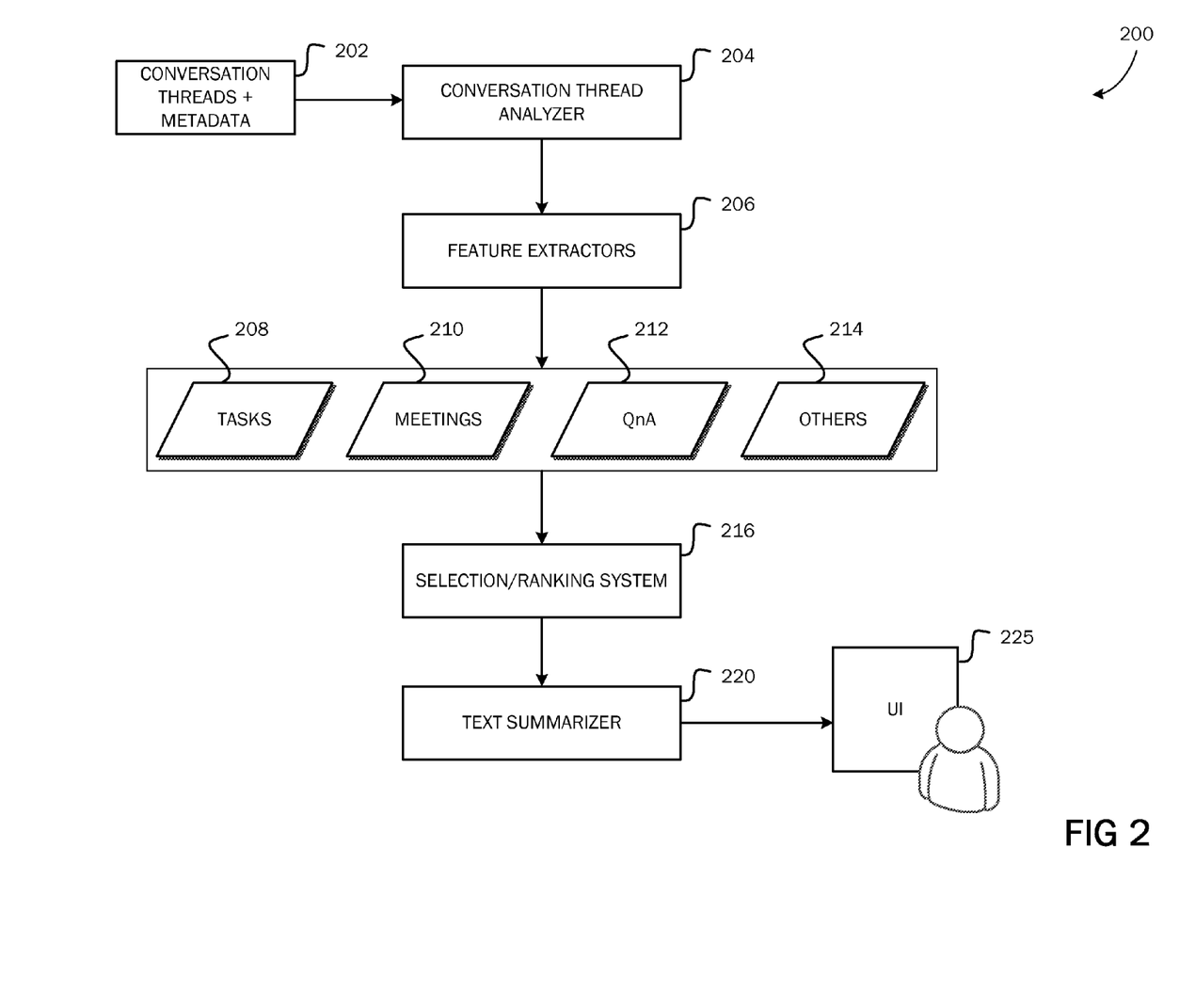
FIG. 2 illustrates a system architecture for automatically summarizing an electronic conversation thread.

FIG. 2 illustrates a system architecture of a conversation thread summarizing system 200 for automatically summarizing an electronic conversation thread. The conversation threads and metadata 202 component is illustrative of one or more memory storage areas at which conversation threads, messages comprising conversation threads and metadata items associated with conversation threads may be stored and from which information about the conversation threads may be obtained for use in generating summaries for conversation threads. For example, the messages illustrated in FIG. 1 may be stored in the repository 202, and metadata items, for example, identification of message senders, identification of message receivers, dates/times of message transmission and receipt, subject lines manually entered for any messages comprising the conversation threads, generated and stored topic titles for the conversation threads, relation between a given conversation thread or messages comprising the conversation thread and other messages or other conversation threads, and the like may be obtained.

The conversation thread analyzer component 204 is illustrative an application or module operative to process received conversation thread items for generation of conversation thread summaries. Received conversation threads and metadata are analyzed and formatted as necessary for text processing described below. According to embodiments, the conversation thread analysis may be performed by a text parser operative to parse text contained in the retrieved conversation threads and associated metadata for processing the text into one or more text components (e.g., sentences and terms comprising the one or more sentences). For example, if the conversation threads and associated metadata are formatted according to a structured data language, for example, Extensible Markup Language (XML), the conversation thread analysis may include parsing the retrieved conversation threads and associated metadata according to the associated structured data language for processing the text as described herein. For another example, the conversation threads and associated metadata may be retrieved from an online source such as an Internet-based chat forum where the retrieved text may be formatted according to a formatting such as Hypertext Markup Language (HTML). According to embodiments, the conversation thread analysis may be include formatting the retrieved conversation threads and associated metadata from such a source so that it may be processed for conversation topics as described herein.

The text included in the messages comprising the conversation thread next may be processed for use in generating conversation thread summaries. A text processing application may be employed whereby the text is broken into one or more text components for determining whether the received/retrieved text may contain terms that may be formed into a topic title for the conversation thread. Breaking the text into the one or more text components may include breaking the text into individual sentences followed by breaking the individual sentences into individual tokens, for example, words, numeric strings, etc.

Such text processing is well known to those skilled in the art and may include breaking text portions into individual sentences and individual tokens according to known parameters. For example, punctuation marks and capitalization contained in a text portion may be utilized for determining the beginning and ending of a sentence. Spaces contained between portions of text may be utilized for determining breaks between individual tokens, for example, individual words, contained in individual sentences. Alphanumeric strings following known patterns, for example, five digit numbers associated with zip codes, may be utilized for identifying portions of text. In addition, initially identified sentences or sentence tokens may be passed to one or more recognizer programs for comparing initially identified sentences or tokens against databases of known sentences or tokens for further determining individual sentences or tokens. For example, a word contained in a given sentence may be passed to a database to determine whether the word is a person's name, the name of a city, the name of a company, or whether a particular token is a recognized acronym, trade name, or the like. As should be appreciated, a variety of means may be employed for comparing sentences or tokens of sentences against known, words, or other alphanumeric strings for further identifying those text items. For example, referring to the example electronic mail messages illustrated in FIG. 1, text processing may include breaking each of the mail messages into individual words that may be utilized in association with other properties obtained for the example mail items in automatically generating a summary for the thread.

The feature extraction component 210 is illustrative of a collection of communication item features extracted from each of the communications comprising a given conversation thread with which a conversation thread summary will be generated for presenting to a user via the user interface component 130. For any given conversation thread having a number of conversation items, various features and properties are associated with each item to provide helpful information in summarizing the relevance of the item relative to other items in the conversation thread. For example, properties and features that may be extracted from each conversation thread item include identification of communication item sender, identification of communication item recipients, date/time of communication item transmission, date/time of transmission and receipt relative to other communication items, importance level associated with communication items, flags attached to communication items, content items attached to communication items, and the like.

Referring still to FIG. 2, other features extracted from communication items comprising a conversation thread include substantive content items contained in communication thread items. For example, tasks 208 may be embedded in conversation thread items and may have helpful information that may be used for generating a conversation thread summary. Meeting information, for example, meeting requests 210 likewise may provide valuable information that may be used for generating a conversation thread summary, for example, a subject line associated with a meeting request that may include information that summarizes the reason for the meeting request. Questions and answers embedded in text contained in electronic mail items, text messages, or other messaging 206 similarly may be used to extract helpful information that may be used for summarizing a conversation thread comprised of various communication items.

A variety of other communication item features 207 may also be utilized by the conversation thread summarizing system 200 for obtaining information for generating and presenting a conversation thread summary as illustrated in the user interface component 130. For example, while a first conversation thread may be comprised of electronic mail items, information may be obtained by the system 200 from other sources, for example, a source of text messages that may include information useful in generating a summary for a conversation thread comprised of electronic mail items. In addition, other sources of information, for example, contacts lists, calendars of users identified in the conversation thread, tasks lists of users identified in the conversation thread, and the like may be utilized for gathering information that may be used for generating a conversation thread summary, as described herein.

The selection/ranking component 216 is illustrative of a determination made by the system 200 as to the importance, weight, or relevance of the various features and properties extracted from the electronic communication items, as described above. For example, during the selection/ranking operation, duplicate features may be removed, features considered to be irrelevant, for example, an electronic mail item having no text associated with other electronic mail items in the conversation thread may be removed, outdated meeting requests that have been superseded by subsequent meeting requests may be removed, and more recent conversation items in an lengthy conversation thread may be raised to a higher relevance in the conversation thread, and features extract from those items may take on higher relevance in generating the conversation thread summary. For example, the timeline of the conversation thread based on send/receive dates and times may be used for initially aligning the conversation thread items for future extraction and analysis.

The text summarization component 220 is illustrative of the generation of a conversation thread summary comprised of one or more communication item features, for example, words, phrases, numeric strings, and the like extracted from various communication thread items into a conversation thread summary that may be presented to users associated with the conversation thread. The user interface component 225 is illustrative of the presentation of the conversation thread summary to users of the conversation thread to allow the users a quick and easy understanding of the nature and relevance of the conversation thread they are reviewing.

Figure 3:
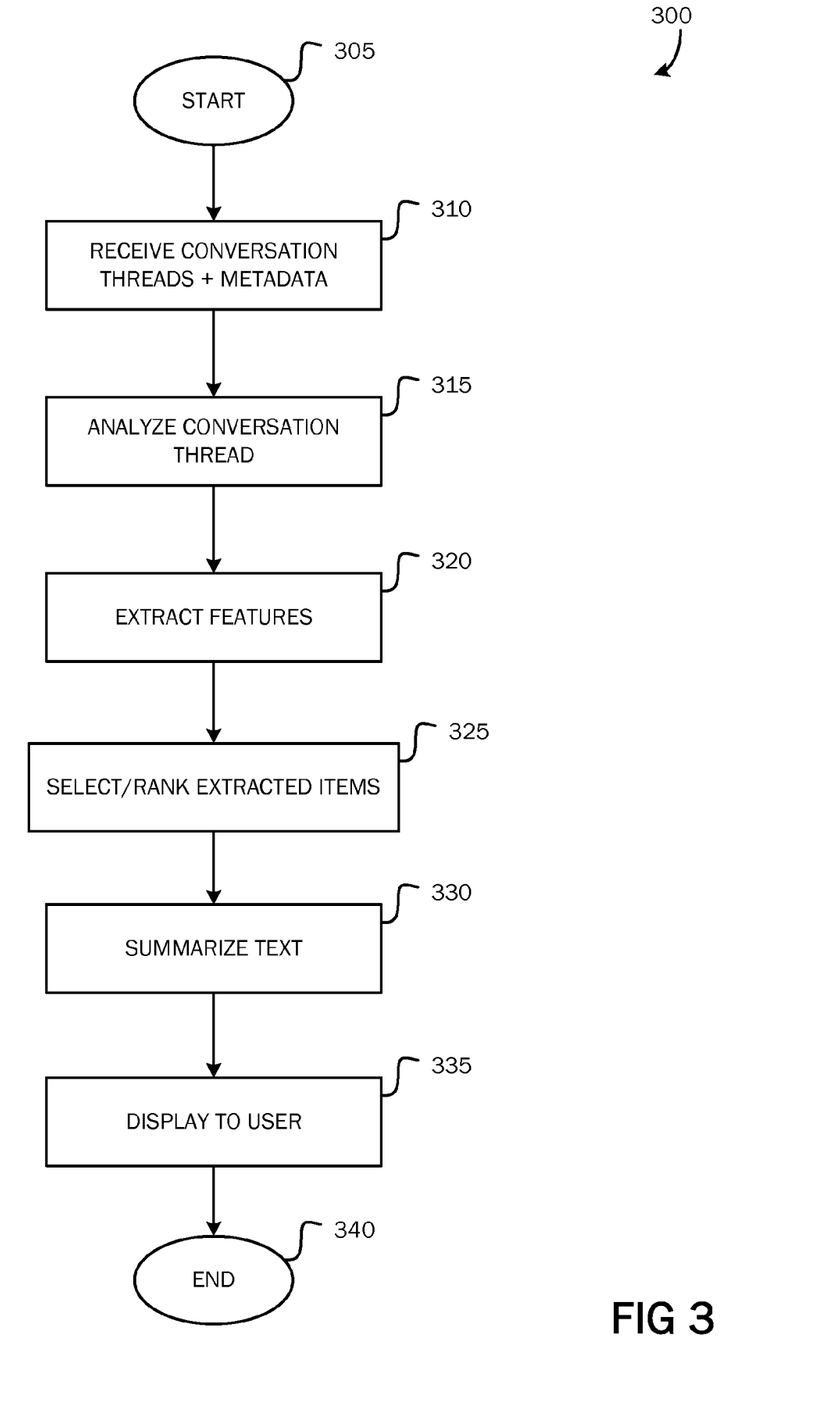
FIG. 3 illustrates a process flow for automatically summarizing an electronic conversation thread.

FIG. 3 illustrates a process flow for automatically summarizing an electronic conversation thread. The method 300 begins at start operation 305 and proceeds to operation 310 where conversation threads and associated metadata are obtained from various sources at which conversation thread items may be stored. For example, electronic mail items and associated metadata may be stored at an electronic mail server that provides electronic mail storage for a large organization. Alternatively, electronic mail items that may be utilized for generating an electronic mail thread summary may be stored at a variety of different electronic mail servers or storage media located in a distributed computing environment where some items are located in one server, some items are located in another server, and so on. For another example, text messages that may be utilized for generating a conversation thread summary may be distributed across storage servers operated by various communications services providers responsible for providing text messaging services to various users. For another example, the conversation threads and metadata may be retrieved from Internet-based chat services, where the messages, message content, and message metadata may be stored in one or across numerous storage services systems.

According to an embodiment, operation 310 is performed after a user conducts some operation for assembling a given conversation thread for which a conversation thread summary is to be generated. For example, if a user is associated with a project team that has sent and received a variety of electronic mail messages concerning a given aspect of the project, the user may desire to search for all electronic mails associated with that project aspect. Once the user enters some type of search criteria, the user may receive a great number of electronic mail items having some relevance to the desired aspect of the project. For example, the listing of electronic mail messages illustrated in FIG. 1 may be displayed to the user as the result of a search on the "project AB" identified in each of the example electronic mail items. Unfortunately, the user may be forced to read through numerous electronic mail items, some of which may be of little relevance to the user to determine a more particular relevance or nature of the communication thread. Thus, at operation 310, the communication thread identified by the user's search that results in a collection of communication items comprising the thread is retrieved for analysis and generation of the conversation thread summary, as described below.

At operation 315, text and metadata retrieved from each of the communication items contained in the conversation thread are analyzed, formatted and processed into individual terms, e.g., words, phrases, numeric strings, etc. as described above with reference to the conversation thread analyzer 204. The individual terms extracted from the thread items may be used to construct a conversation summary for the thread.

At operation 320, features from the communication items comprising the retrieved communication thread are extracted for use in generating a communication thread summary. As described above with reference to FIG. 2, feature extraction at operation 320 includes extracting terms and information from the processed text and metadata for each of the communication items that may be useful in determining the relationship between the communication items and then ultimately generating a communication thread summary. As should be appreciated, extracted features from the communication items and associated metadata may be stored temporarily for selection and ranking.

At operation 325, the extracted features from the communication items and associated metadata are selected and ranked for use in the generation of the conversation thread summary. As described above, selection of one or more features may include discarding certain features that are considered duplicative or irrelevant. For example, if the same terminology is used in two consecutive communication items, the terminology from one of the communication items may be discarded. For another example, if a communication item comprising a communication thread includes no terms or metadata in common with other communication items, then the communication item and its extracted features may be discarded. Once a set of features is selected, the selected features may be ranked in order of importance. For example, more recent communication items may be ranked above older communication items. Out-of-date meeting requests and information contained therein may be discarded in lieu of more up-to-date meeting requests and information contained therein.

At operation 330, a summarization of text features extracted from the various communication items comprising the communication thread is performed. Based on the selection and ranking performed at operation 325, a grouping of key words or other terms extracted from the conversation thread may be generated into a conversation thread summary as illustrated above in FIG. 1. For example, referring back to FIG. 1, each of the example electronic mail items includes the terms "project" and "AB." In addition, the term "documents" appears in close proximity to the terms "project" and "AB." Finally, a number of the electronic mail items include scheduling features that may be associated with task items and calendar items extracted by the system 200 when the electronic mail thread was assembled. As a result, a text summary of "project AB schedule and documents" is generated for the example conversation thread.

The example conversation thread summary of "project AB schedule and documents" is simplified for purposes of illustration. According to embodiments, the extracted and presented conversation thread summary may include the use of a set of sentences or phrases extracted from analyzed electronic mail items, text messages, task items, calendar items and the like as a summary of the associated thread. That is, the presented summary in the user interface component 130 may include one or more sentences extracted from a conversation thread, one or more tasks extracted from a tasks storage, one or more meeting schedule items extracted from a calendar application in association with a conversation thread, answers to questions posed in a conversation thread, or combinations of these items that all occur in or are associated with a given conversation thread. For example, a summary presented in the user interface component 130 may include a couple of thread sentences, a task item and a calendar item as a summary of the associated thread.

At operation 330, according to one embodiment, the initially generated conversation thread summary may be presented to the user prior to establishment of the initially generated summary as the final conversation thread summary for the example conversation thread. The presentation of the candidate conversation thread summary may be presented to the user in a user interface component, as illustrated above in FIG. 1B. If a user accepts the presented candidate conversation thread, then the candidate conversation thread will be stored and presented as the final conversation thread summary. Alternatively, the user may be provided with a field 155, as illustrated above in FIG. 1B to allow the user to enter a preferred conversation thread summary that may replace the conversation thread summary recommended by the system 200. Alternatively, the candidate conversation thread summary generated by the system 200 may be automatically presented to users of the conversation thread in the user interface component 130 illustrated above in FIG. 1A without user interaction.

At operation 335, the conversation summary generated by the system 200, or the conversation summary modified or accepted by the user at operation 330 is displayed to the user in the conversation summary user interface component 130, as illustrated and described above with reference to FIG. 1A. As should be appreciated, the conversation thread summary generation method may be performed by the system 200 each time a conversation thread is obtained by a given user, or a previously generated conversation thread summary may be obtained from storage and may be presented to the user. According to one embodiment, each time additional conversation items are added to the conversation thread, the method 300 may be re-accomplished to account for additional conversation item features that may have been added to the conversation thread by the addition of the new conversation item. After the conversation thread summary is presented to the user via the user interface component described above, the method ends at operation 340.

Figure 4:
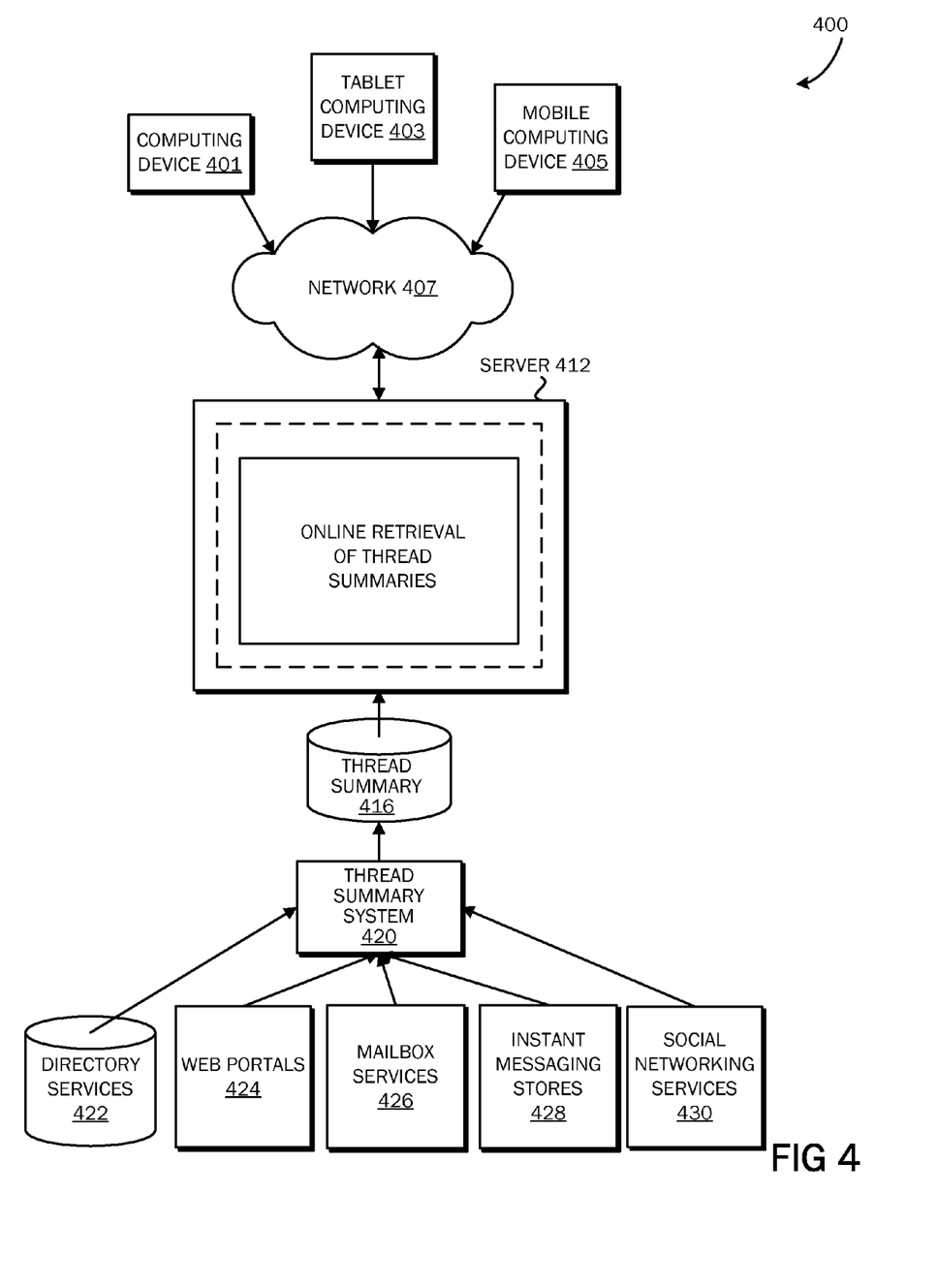
FIG. 4 illustrates a system architecture for automatically summarizing an electronic conversation thread.

FIG. 4 illustrates a system architecture for providing conversation thread summaries to various client devices after generation as described above. As described previously, an automatic conversation thread summary system 420 may generate thread summaries from conversation threads and metadata retrieved using a variety of communication channels and stores. Information and features helpful to generating conversation thread summaries may also be stored in different communication channels or other storage types. For example, conversation thread communication items, metadata or feature information may be stored using directory services 422, web portals 424, mailbox services 426, instant messaging stores 428 and social networking sites 430. The automatic conversation thread summary system 420 may use any of these types of systems or the like to store conversation thread summaries in a thread summary store 416. A server 412 may provide conversation thread summaries to clients. As one example, server 412 may be a web server providing thread summaries over the web. Server 412 may provide online thread summaries over the web to clients through a network 407. Examples of clients that may obtain thread summaries include computing device 401, which may include any general purpose personal computer, a tablet computing device 403 and/or mobile computing device 405 which may include smart phones. Any of these devices may obtain thread summaries from the thread summary store 416.

As described above, embodiments of the invention may be implemented via local and remote computing and data storage systems, including the systems illustrated and described with reference to FIGS. 1A, 1B, 2, 3 and 4. Consistent with embodiments of the invention, the aforementioned memory storage and processing unit may be implemented in a computing device, such as computing device 500 of FIG. 5. According to embodiments, the computing device may be in the form of a personal computer, server computer, handheld computer, smart phone, tablet or slate device, or any other device capable of containing and operating the computing components and functionality described herein. In addition, the computing device components described below may operate as a computing system printed on a programmable chip. Any suitable combination of hardware, software, or firmware may be used to implement the memory storage and processing unit. For example, the memory storage and processing unit may be implemented with computing device 500 or any other computing devices 518, in combination with computing device 500, wherein functionality may be brought together over a network in a distributed computing environment, for example, an intranet or the Internet, to perform the functions as described herein. The aforementioned system, device, and processors are examples and other systems, devices, and processors may comprise the aforementioned memory storage and processing unit, consistent with embodiments of the invention. Furthermore, computing device 500 may comprise operating environment 100 as described above.

Figure 5:
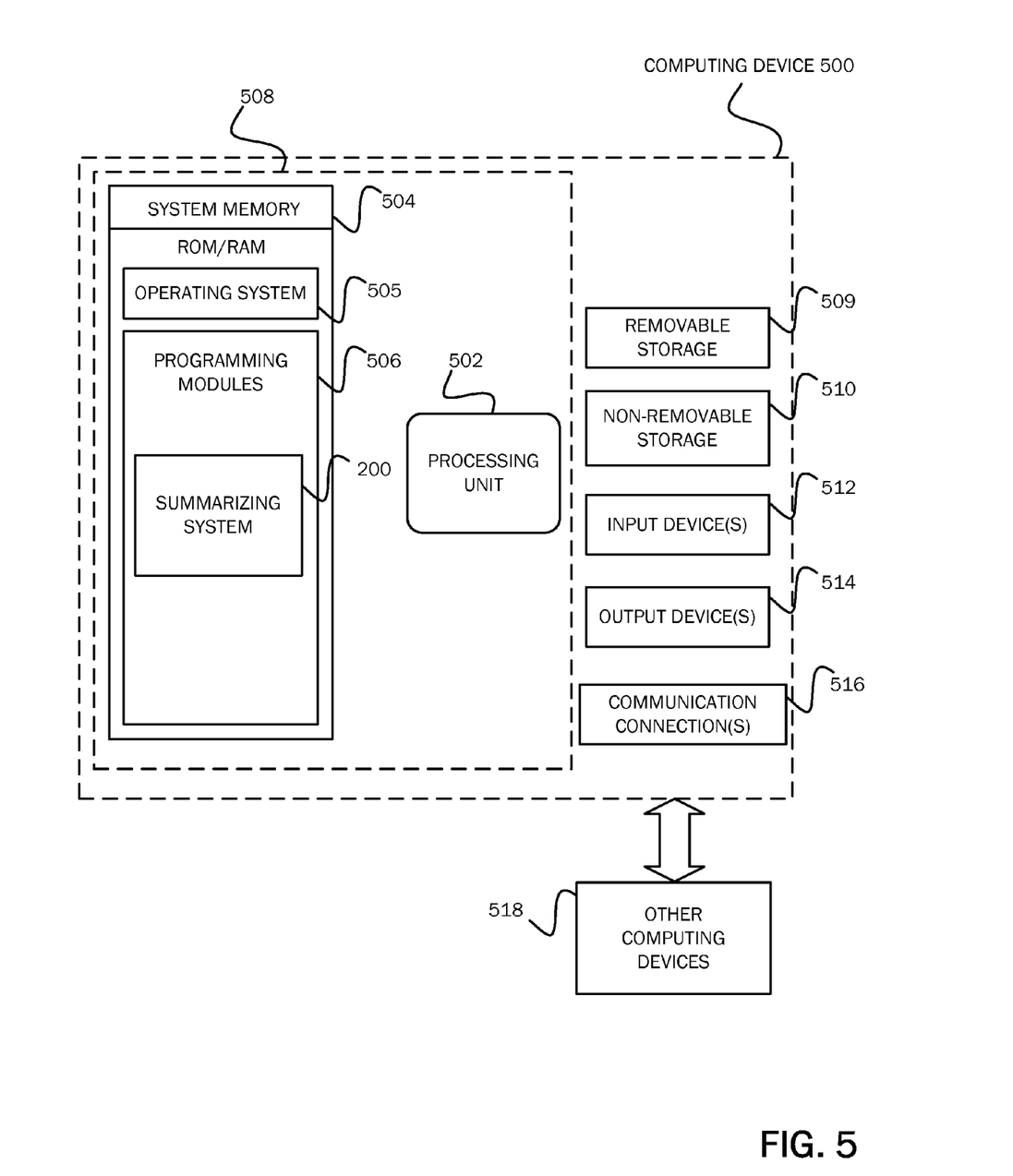
FIG. 5 is a block diagram of a system including a computing device with which embodiments of the invention may be practiced.

With reference to FIG. 5, a system consistent with embodiments of the invention may include a computing device, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include the conversation topic detection, generation and storage system 200 having sufficient computer-executable instructions, which when executed, performs functionalities as described herein. Operating system 505, for example, may be suitable for controlling computing device 500's operation. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computing device 500 may also contain a communication connection 516 that may allow device 500 to communicate with other computing devices 518, such as over a network in a distributed computing environment, for example, an intranet or the Internet. Communication connection 516 is one example of communication media.

As stated above, a number of program modules and data files may be stored in system memory 504, including operating system 505. While executing on processing unit 502, programming modules 506 and may include the automatic conversation thread summary generation system 200, 420 which may be program modules containing sufficient computer-executable instructions, which when executed, performs functionalities as described herein. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The term computer readable media as used herein may include computer storage media. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A method of automatically summarizing an electronic conversation thread, the method being implemented by a processor executing executable instructions on a memory storage, comprising:
   receiving a conversation thread comprised of electronic communications;
   processing the electronic communications of the received conversation thread to identify text components, the text components including phrases in the electronic communications;
   selecting at least two of the electronic communications for use in generating a conversation thread summary;
   discarding, from the selected electronic communications, electronic communications being duplicates of other selected electronic communications;
   ranking the selected electronic communications based on ranking criteria including importance, weight or relevance of various features and properties associated with each of the selected electronic communications;
   processing the text components to identify key words based on the ranking of the selected electronic communications; and
   generating the conversation thread summary comprising a portion of the key words and the text components, wherein the key words and the text components are selected based on the ranking of the selected electronic communications.

2. The method of claim 1, further comprising displaying the generated conversation thread summary in a user interface component for review by a user of the conversation thread.

3. The method of claim 2, wherein receiving the conversation thread comprised of electronic communications includes receiving the conversation thread comprised of electronic communications in response to searching a storage of electronic communications according to a first search criteria.

4. The method of claim 3, wherein upon receiving a second conversation thread comprised of different electronic communications, generating a second conversation thread summary for the different electronic communications.

5. The method of claim 4, further comprising displaying the generated second conversation thread summary in the user interface component for review by the user of the conversation thread.

6. The method of claim 1, prior to generating the conversation thread summary, presenting a candidate conversation thread summary to a user of the retrieved conversation thread for user acceptance of the candidate thread summary as a correct conversation thread summary.

7. The method of claim 6, wherein if the user accepts the candidate conversation thread summary as a correct summary for the conversation thread, generating the conversation thread summary from the accepted candidate conversation thread summary.

8. The method of claim 7, wherein if the user does not accept the candidate conversation thread summary as the correct summary for the conversation thread, receiving a modified conversation thread summary from the user and generating the modified conversation thread summary as a corrected summary for the conversation thread.

9. The method of claim 1, wherein selecting at least two of the electronic communications for use in generating the conversation thread summary includes discarding one or more of the electronic communications from use in generating the conversation thread summary where discarded communications do not contain any features relevant to the conversation thread.

10. The method of claim 1, wherein ranking the selected electronic communications based on one or more ranking criteria further comprises ranking the selected electronic communications based on a date and time associated with each of the selected electronic communications.

11. The method of claim 1, further comprising associating the generated conversation thread summary with the retrieved conversation thread.

12. The method of claim 11, further comprising storing the generated conversation summary associated with the retrieved conversation thread for subsequent retrieval with the retrieved conversation thread.

13. The method of claim 12, prior to generating the summary for the conversation thread, determining whether an existing conversation thread summary has already been generated for the conversation thread.

14. The method of claim 13, wherein if the existing conversation thread summary has already been generated for the conversation thread, determining whether one of the electronic communications of the conversation thread was added to the conversation thread after the conversation thread summary was generated for the conversation thread.

15. The method of claim 14, wherein if one of the electronic communications of the conversation thread was added to the conversation thread after the conversation thread summary was generated for the conversation thread, determining whether the existing conversation thread summary requires revision; and if the existing conversation thread summary requires revision, revising the conversation thread summary to incorporate a portion of the text components of the electronic communications that were added to the conversation thread after the existing conversation thread summary was generated.

16. The method of claim 1, further comprising processing the electronic communications to identify text components further comprises breaking the electronic communications of the conversation thread into text components.

17. A computer readable medium, not including a signal, containing computer executable instructions which when executed by a computer perform a method of automatically summarizing an electronic conversation thread, comprising:
receiving a conversation thread comprised of electronic communications in response to searching a storage of electronic communications according to a first search criteria;
processing the electronic communications of the received conversation thread to identify text components comprising the electronic communications, the text components including phrases in the electronic communications;
receiving a selection of the electronic communications;
discarding selected electronic communications being duplicates of other selected electronic communications, wherein the discarded selected electronic communications are consecutive to another selected electronic communication having the same terminology;
ranking the selected electronic communications based on one or more ranking criteria including importance, weight or relevance of various features, and properties associated with each of the selected electronic communications;
processing the text components to identify key words relevant to the conversation thread based on the ranking of the selected electronic communications;
generating a conversation thread summary comprising a portion of the key words and the text components, wherein the key words and text components are selected to comprise the portion are based on the ranking of the selected electronic communications; and
displaying the generated conversation thread summary in a user interface component for review by a user of the conversation thread.

18. The computer readable medium of claim 17, wherein upon receiving a second conversation thread comprised of different electronic communications, generating a second conversation thread summary for the different electronic communications; and
displaying the generated second conversation thread summary in the user interface component for review by the user of the conversation thread.

19. A system of automatically summarizing an electronic conversation thread, comprising:
a processing unit;
a memory storage, including computer executable instructions, which when executed are operable to:
receive an electronic conversation thread comprised of electronic communications;
process the electronic communications of the electronic conversation thread to identify text components, the text components including phrases in the electronic communications;
receive a selection of the electronic communications;
discard at least one selected electronic communications being a duplicate of other selected electronic communication;
rank the electronic communications of the selection based on ranking criteria including importance, weight, or relevance or various features and properties associated with each of the electronic communications of the selection;
process the text components to identify key words relevant to the electronic conversation thread based on the ranked electronic communications;
generate a candidate conversation thread summary comprising a portion of the key words and the text components based on the ranked electronic communications;
present the candidate conversation thread summary to a user for user acceptance of the candidate thread summary as a correct conversation thread summary;
when the user accepts the candidate conversation thread summary, adopt the candidate conversation thread summary as the correct conversation thread summary; and when the user does not accept the candidate conversation thread summary, receive a modified conversation thread summary from the user and adopt the modified conversation thread summary as the correct conversation thread summary.

20. The system of claim 19, wherein the system is further operable to:

discard one or more electronic communication that do not include the key words.

* * * * *